J. GAJAN.
NON-SKID DEVICE FOR AUTOMOBILE TRUCKS.
APPLICATION FILED NOV. 30, 1915.

1,272,938.

Patented July 16, 1918.

WITNESSES
H. J. Bruges
B. Cooke

INVENTOR
Joseph Gajan
BY Everett Peek
ATTORNEY

UNITED STATES PATENT OFFICE.

JOSEPH GAJAN, OF NEW YORK, N. Y.

NON-SKID DEVICE FOR AUTOMOBILE-TRUCKS.

1,272,938.   Specification of Letters Patent.   Patented July 16, 1918.

Application filed November 30, 1915. Serial No. 64,249.

*To all whom it may concern:*

Be it known that I, JOSEPH GAJAN, a subject of the Emperor of Austria, and residing at East New York, in the county of Kings and State of New York, have invented a new and Improved Non-Skid Device for Automobile-Trucks, of which the following specification is a full disclosure.

This invention relates to non-skid devices for automobile trucks, and more particularly to a unit adapted to be used in multiple to provide a rigid non-skid tire or tread surrounding the periphery of the truck wheel. One of the objects thereof is to provide a simple, inexpensive and efficient article of the character described suitable for attachment to the double-solid-tire-type wheel commonly used on automobile trucks, and adjustable to allow for the reduction in size of such wheels because of the wear of the tires. Other objects will be in part obvious and in part pointed out hereinafter.

This invention, accordingly, consists in the novel features of construction and arrangement of parts herein shown and described, and particularly pointed out in the claims.

In the accompanying drawings wherein is shown one of the various possible embodiments of my invention, and in which like reference characters refer to similar parts throughout:—

Figure 1 indicates the side elevation of a truck wheel equipped with the non-skid device.

Figures 1, 2:
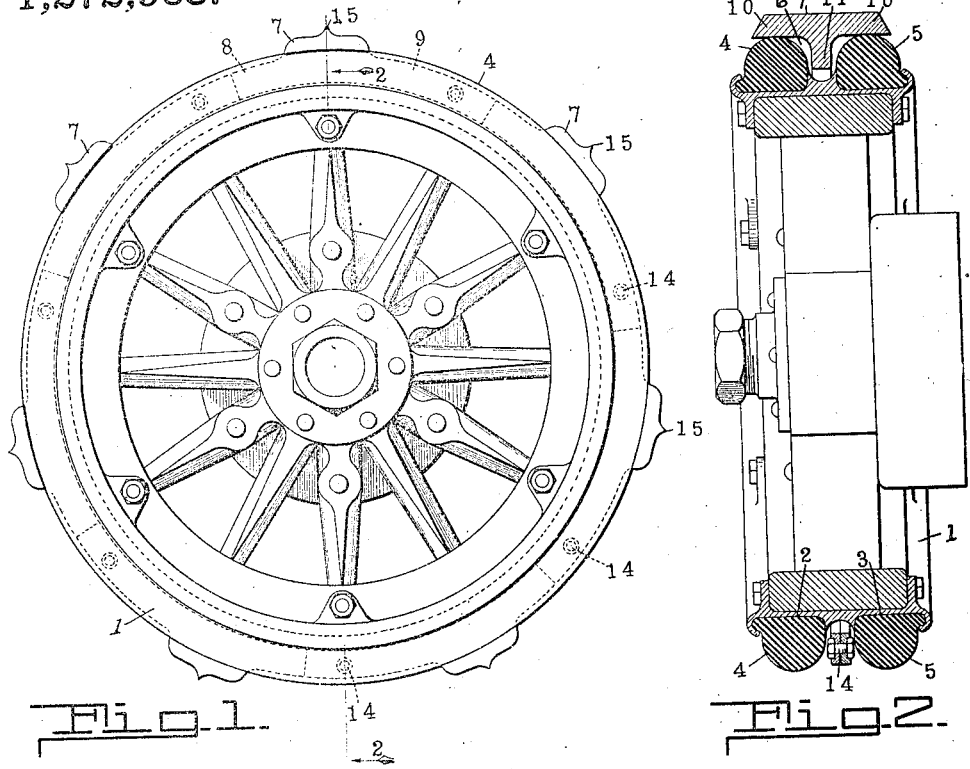
Fig. 2 is a cross-section on line 2—2 of Fig. 1.
Figure 3:
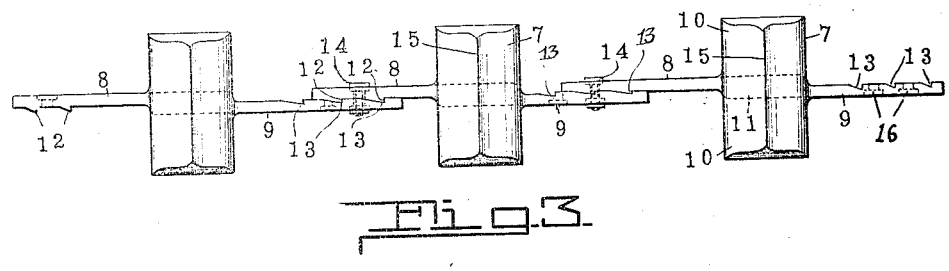
Fig. 3 is a plan view of several of the blocks or units showing their connection with one another.

Referring to the drawings, a truck wheel 1 is shown provided with two tire grooves 2 and 3 within which are seated the solid rubber tires 4 and 5. The tires are spaced apart as shown and therebetween is formed a circumferential groove 6.

Figure 4:
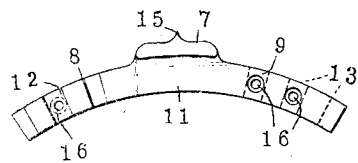
Fig. 4 is a side elevation of one of said units.

The non-skid device, instead of being a flexible chain such as is ordinarily employed to prevent the slipping of truck wheels when passing over ice or muddy roads, comprises a plurality of like blocks or units 7, arranged in multiple and joined rigidly together by means of the clamping extensions 8 and 9 to form a detachable tire adapted to lie in the circumferential groove 6. The block 7 is provided with laterally projecting ends 10 which overlie and tightly grip the tires 4 and 5 when the plurality of blocks are drawn together and secured about the wheel. The blocks 7 together with the clamping extensions 8 and 9 are preferably made in one piece as a steel casting or drop forging, the block proper being substantially rectangular in plan view and provided with an acute ridge or biting edge 15. The extensions 8 and 9 which project at right angles from opposite sides of the block 7 are slightly offset respectively upon opposite sides of the transverse center line thereof, the meeting or abutting faces of the extensions thus engaging each other substantially in the vertical central plane of the wheel; and where they join the block are continued therebeneath to form the web 11, which lies in the groove 6. The extension 8 is provided with teeth 12 adapted to project beyond said central plane into depressions 13 formed in the complementary portion 9 of the next consecutive block, when in use. As shown in Fig. 4. the entire member, from the end of part 8 to the end of part 9, is made in the form of a circular arc having a slightly greater radius than the wheel it is designed to fit, whereby there is provided a slight clearance between the inner edge of the web and the bottom of the groove 6, for the sake of resiliency of the device in practice, it being remembered that the end extensions 10 of each block bear flatly upon the rubber tires and are hence adapted to move therein to a certain extent toward the metal frame of the wheel when the load is borne upon the blocks. As the tires wear it become necessary to reduce the length of the non-skid tire proportionately. This is accomplished by bringing two or more of the blocks closer together, and engaging the teeth 12 in other depressions 13. It will be noted that for this purpose the number of depressions exceeds the number of teeth. The consecutive blocks are secured together by any suitable fastening device. In the drawings the bolt 14 is shown, which passes through registering holes 16 in the complementary extensions, extra holes being provided in the extensions 9 to correspond with the additional depressions 13. In the usual practice of articulated anti-skid devices of the class to which this improvement relates, a source of much trouble and annoyance lies in the danger of shearing the bolts or pivots connecting adjacent blocks or links, it being borne in mind that the strain on such connecting means incident to the traction of the vehicle is enormous. In my improvement, however, the primary function of the bolts 14 is to simply hold the adjacent members from lateral or radial displacement, whereby the main strain from one block or link to another is borne directly by the interlocking teeth 12 and notches 13 of the overlapping complemental block extensions 8 and 9. These interlocking features 12 and 13 being formed radial are substantially perpendicular to that tangent that represents the traction strain on each block in succession. All danger of shearing of the bolts or rivets therefore is practically eliminated.

These anti-skid devices are made in standard sizes to fit standard size wheels. The adjustment provided for by the making of one more notch 13 than there are teeth 12 is for the purpose of taking up the device slightly a notch or two, thereby reducing its circumference, to compensate for the natural wear upon the periphery or tread portion of the rubber tires 4 and 5. While each block and its extensions are curved in an arc of a circle as shown in Fig. 4 it is immaterial for all practical purposes of the device whether a true geometrical circle is provided by the entire device or not, in any phase of its adjustment or operation. Furthermore, ample provision is made for the maximum shrinkage of the device, by the loosening of all of the bolts, to accommodate to the greatest amount of wear upon the standard wheel for which the device is designed.

In operation, when it is desired to attach the non-skid tread to a truck wheel, a sufficient number of the units 7 to completely surround it are loosely bolted together about the same. Then the complementary members of consecutive units are adjusted relatively by means of the teeth 12, depressions 13 and the plural holes 16, so that when the ends of the device are brought together all of the blocks 7 will press evenly upon the rubber tires of the wheel, with sufficient pressure to prevent slipping of the tread thereon. The ends are then connected by means of a bolt 14, and all of the bolts in the series are made tight. The device now becomes a rigid tire or hoop tightly gripping the wheel tires, and secured against lateral movement with respect to the wheel by the continuous rib or web, formed by the members 8 and 9, which lies within the groove 6.

As many changes can be made in the construction above-described, it follows that many widely-different embodiments of this invention can be employed without departing from the scope of my invention. It is intended that all matter contained in the foregoing description, or shown in the accompanying drawings, shall be interpreted as illustrative and not in a limiting sense.

Having thus described my invention what I claim as new and desire to secure by Letters Patent is as follows:—

1. The herein described anti-skid device for automobile truck wheels comprising an annular series of similar gripping blocks, each block including a curved attachment member extending circumferentially therefrom in each direction, one extension of each block overlapping a complemental extension of the next adjacent block in the series, and means passing transversely through the overlapping portions of the extensions to secure the blocks together, said overlapping portions being provided with rigid interlocking devices to sustain the main strain imposed upon the blocks.

2. The herein described anti-skid device for automobile truck wheels comprising in combination an annular series of rigid blocks, each block including circumferentially directed extensions on the opposite sides thereof, one extension having laterally projecting radial teeth and the other extension having a plurality of depressions adapted to receive certain of said teeth of the next adjacent block, the portions of adjacent blocks which have the teeth and depressions overlapping each other and provided with transverse holes, and attachment means passing laterally through said holes to lock the adjacent blocks together.

3. As an article of manufacture, an elongated block having a ground-gripping surface, and a pair of complementary clamping members extending from opposite sides of said block, said members being laterally offset with respect to a plane passing through said block parallel to its transverse axis and each having a surface lying substantially in said plane, and complementary radially directed teeth and depressions disposed upon said surfaces.

In witness whereof, I hereunto subscribe my name, as attested by the two subscribing witnesses.

JOSEPH GAJAN.

Witnesses:
 JOSEPH KRIVACS,
 LOUIS KRIVACS.